US012621082B2

(12) United States Patent
Muharemovic et al.

(10) Patent No.: US 12,621,082 B2
(45) Date of Patent: *May 5, 2026

(54) DATA AND CONTROL MULTIPLEXING IN PUSCH IN WIRELESS NETWORKS

(71) Applicant: TEXAS INSTRUMENTS INCORPORATED, Dallas, TX (US)

(72) Inventors: Tarik Muharemovic, Pearland, TX (US); Zukang Shen, Allen, TX (US); Pierre Bertrand, Antibes (FR); Eko N. Onggosanusi, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,781

(22) Filed: May 19, 2023

(65) Prior Publication Data

US 2023/0299884 A1 Sep. 21, 2023

Related U.S. Application Data

(63) Continuation of application No. 16/665,777, filed on Oct. 28, 2019, now Pat. No. 11,695,514, which is a
(Continued)

(51) Int. Cl.
*H04L 1/1607* (2023.01)
*H04L 5/00* (2006.01)
(Continued)

(52) U.S. Cl.
CPC .......... *H04L 1/1671* (2013.01); *H04L 5/0048* (2013.01); *H04L 5/0055* (2013.01);
(Continued)

(58) Field of Classification Search
CPC ... H04L 1/1671; H04L 5/0048; H04L 5/0055; H04L 5/0007; H04L 25/0226; H04L 25/0228; H04W 72/56; H04W 72/10
(Continued)

(56) References Cited

U.S. PATENT DOCUMENTS 8,687,584 B2 4/2014 Yang et al.
2003/0059865 A1 3/2003 Baker et al.
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 8)," 3GPP TS 36.211 V8.4.0; Sep. 2008; 80 pages.
(Continued)

*Primary Examiner* — Candal Elpenord
(74) *Attorney, Agent, or Firm* — Zhenhai Fu; Gregory Albin; Frank D. Cimino

(57) ABSTRACT

Transmission of information in a wireless network is performed by allocating a channel from a transmitter to a receiver. The channel has at least one time slot with each time slot having a plurality of symbols. Each slot contains at least one reference symbol (RS). As information becomes available for transmission, it is classified as prioritized information (PI) and other information. One or more priority symbols are generated using the digital samples of the priority information. Other symbols are generated using the other data. Priority symbols are transmitted on the channel in a manner that separation of priority symbol(s) and a reference symbol does not exceed a time duration of one symbol. For example, Rank Indicator (RI) is transmitted using symbol k, ACKNAK is transmitted using symbol k+1; and the reference signal (RS) is transmitted using symbol k+2, wherein symbols k, k+1, and k+2 are consecutive in time.

21 Claims, 10 Drawing Sheets

Related U.S. Application Data continuation of application No. 15/371,015, filed on Dec. 6, 2016, now Pat. No. 10,461,893, which is a continuation of application No. 13/491,155, filed on Jun. 7, 2012, now Pat. No. 9,516,663, which is a continuation of application No. 12/364,499, filed on Feb. 2, 2009, now Pat. No. 8,223,808.

(60) Provisional application No. 61/026,215, filed on Feb. 5, 2008.

(51) Int. Cl.
*H04L 25/02* (2006.01)
*H04W 72/56* (2023.01)

(52) U.S. Cl.
CPC ......... *H04L 25/0226* (2013.01); *H04W 72/56* (2023.01); *H04L 5/0007* (2013.01); *H04L 25/0228* (2013.01)

(58) Field of Classification Search
USPC .................................................. 370/329–330
See application file for complete search history.

(56) References Cited

U.S. PATENT DOCUMENTS

| | | | |
|---|---|---|---|
| 2003/0072395 A1 | 4/2003 | Jie et al. | |
| 2008/0318608 A1* | 12/2008 | Inoue ...................... | H04J 13/18 |
| | | | 455/446 |
| 2009/0010240 A1 | 1/2009 | Papasakellariou et al. | |
| 2009/0052387 A1 | 2/2009 | Lee et al. | |
| 2009/0074090 A1 | 3/2009 | Xu et al. | |
| 2009/0097457 A1 | 4/2009 | Papasakellariou et al. | |
| 2009/0232067 A1* | 9/2009 | Pajukoski ............. | H04L 5/0053 |
| | | | 370/329 |
| 2010/0110878 A1 | 5/2010 | Frederiksen et al. | |
| 2010/0165931 A1 | 7/2010 | Nimbalker et al. | |
| 2011/0261774 A1 | 10/2011 | Luntilla et al. | |

OTHER PUBLICATIONS

"3rd Generation Partnership Project; Technical Specification Group Radio Access Network; Evolved Universal Terrestrial Radio Access (E-UTRA); Multiplexing and Channel Coding (Release 8)," 3GPP TS 36.212 V8.4.0; Sep. 2008; 56 pages.
"Ad Hoc Chairman," TSG-RAN WG1 #50, R1-073842, Athens, Greece, Aug. 20-24, 2007, 1 page.

"ACK/NAK DTX Detection in PUSCH," 3GPP TSG RAN WG1 #51bis, R1-080031, Samsung, Sevilla, Spain, Jan. 14-18, 2008, 3 pages.
"On UL Control and Data Multiplexing on PUSCH," 3GPP TSG RAN WG1 #51bis, R1-080088; Motorola, Sevilla, Spain, Jan. 14-18, 2008, 5 pages.
"PUSCH Multiplexing of Data, Control, and ACK/NACK Information," 3GPP TSG RAN WG1 #51bis, R1-080267, LG Electronics, Sevilla, Spain, Jan. 14-18, 2008, 19 pages.
"Details of Control and Data Multiplexing in PUSCH," 3GPP TSG-RAN WG1 #51bis, R1-080483, Qualcomm Europe, Sevilla, Spain, Jan. 14-18, 2008, 5 pages.
"Considerations on Data and Control Multiplexing on PUSCH," 3GPP TSG RAN WG1 #52, R1-080710, Texas Instruments, 2008, 5 pages.
"Prosecution History," U.S. Appl. No. 12/364,499, filed Feb. 2, 2009, 290 pages.
"Prosecution History," U.S. Appl. No. 13/491,155, filed Jun. 7, 2012, 412 pages.
"Prosecution History," U.S. Appl. No. 15/371,015, filed Dec. 6, 2016, 261 pages.
"Prosecution History," U.S. Appl. No. 16/665,777, filed Oct. 28, 2019, 419 pages.
"3rd Generation Partnership Project; Technical Specification Group Radio Access Network; Evolved Universal Terrestrial Radio Access (E-UTRA); LTE Physical Layer—General Description (Release 8)," 3GPP TS 36.201 V8.1.0; Nov. 2007, 13 pages.
"3rd Generation Partnership Project; Technical Specification Group Radio Access Network; Evolved Universal Terrestrial Radio Access (E-UTRA); Physical Channels and Modulation (Release 10)," 3GPP TS 36.211, V10.4.0, Dec. 2011, 101 pages.
"CQI, PMI, and Rank Report Feedback Interval," 3GPP TSG RAN WG1 Meeting #51bis, R1-080111, Sharp, Sevilla, Spain, Jan. 14-18, 2008, 3 pages.
"Multiplexing of Rank. CQI and Data in PUSCH," 3GPP TSG RAN WG1#52bis, R1-081255, LG Electronics, Shenzhen, China, Mar. 31-Apr. 4, 2008, 3 pages.
"LTE; Evolved Universal Terrestrial Radio Access (E-UTRA); User Equipment (UE) Radio Transmission and Reception (3GPP TS 36.101 version 10.5.0 Release 10)," ESTI TS 136.101, V10.5.0, Jan. 2012, 288 pages.
3rd Generation Partnership Project; Technical Specification Group Radio Access Network; Evolved Universal Terrestrial Radio Access (E-UTRA); User Equipment (UE) Radio Transmission and Reception (Release 10); 3GPP TS 36.101; V.10.5.0; Dec. 2011, 345 pages.
"Separate Rank and CQI Feedback in PUCCH" 3GPP TSG RAN WG1 #51bis, R1-080192, Sevilla, Spain, Jan. 14-18, 2008, 8 pages.
"Draft Report of 3GPP TSG RAN WG1 #51 v1.0.0" R1-080002, (Jeju, South Korea, Nov. 5-9, 2007), 69 pages.

\* cited by examiner

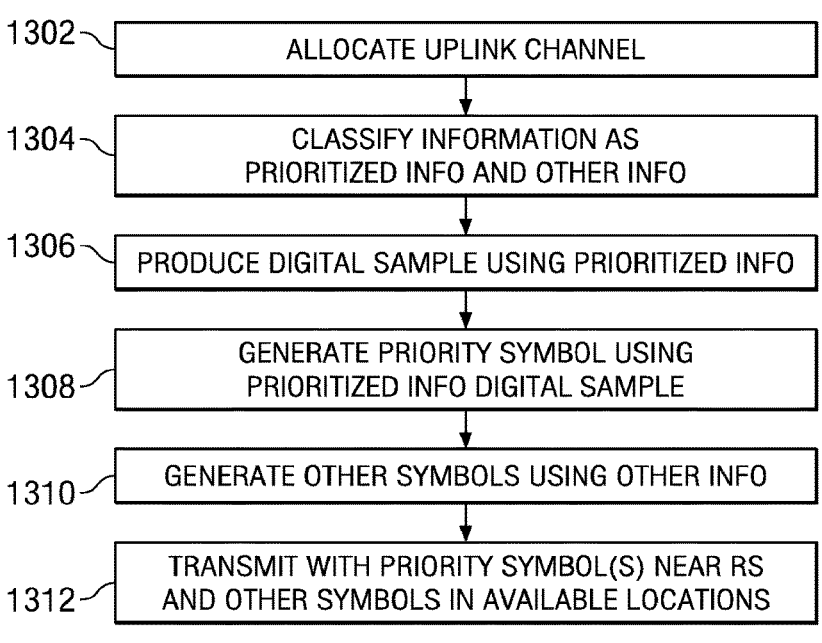

1302 — ALLOCATE UPLINK CHANNEL

1304 — CLASSIFY INFORMATION AS PRIORITIZED INFO AND OTHER INFO

1306 — PRODUCE DIGITAL SAMPLE USING PRIORITIZED INFO

1308 — GENERATE PRIORITY SYMBOL USING PRIORITIZED INFO DIGITAL SAMPLE

1310 — GENERATE OTHER SYMBOLS USING OTHER INFO

1312 — TRANSMIT WITH PRIORITY SYMBOL(S) NEAR RS AND OTHER SYMBOLS IN AVAILABLE LOCATIONS

*FIG. 13*

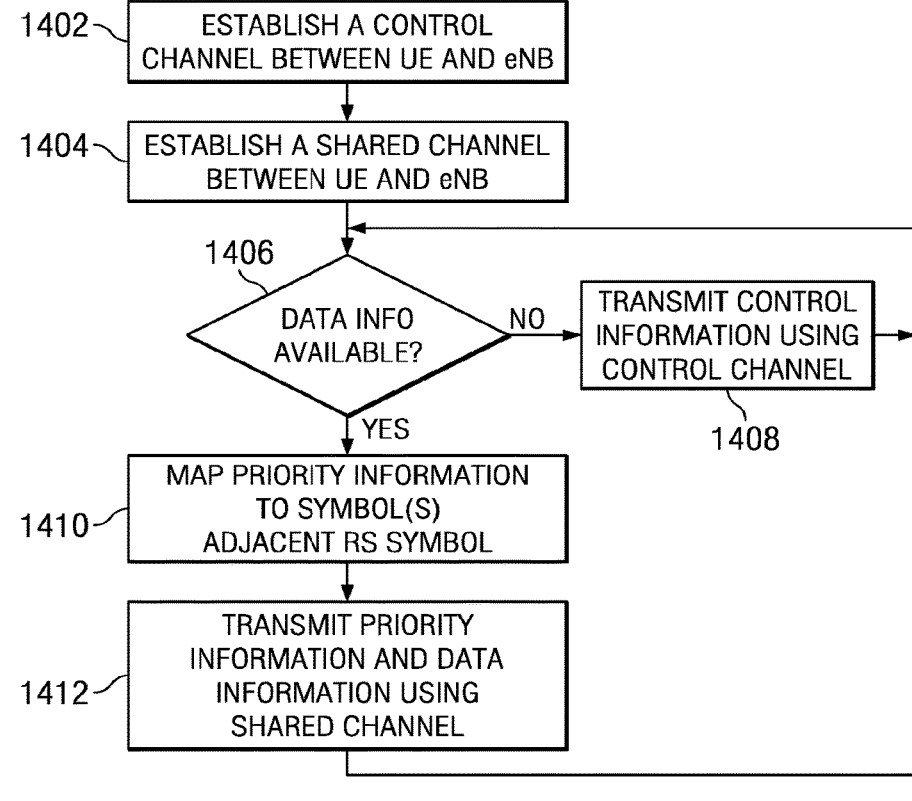

1402 — ESTABLISH A CONTROL CHANNEL BETWEEN UE AND eNB

1404 — ESTABLISH A SHARED CHANNEL BETWEEN UE AND eNB

1406 — DATA INFO AVAILABLE?

NO — TRANSMIT CONTROL INFORMATION USING CONTROL CHANNEL — 1408

YES

1410 — MAP PRIORITY INFORMATION TO SYMBOL(S) ADJACENT RS SYMBOL

1412 — TRANSMIT PRIORITY INFORMATION AND DATA INFORMATION USING SHARED CHANNEL

*FIG. 14*

1502 — ALLOCATE A CONTROL CHANNEL (PUCCH) FROM MOBILE UE TO NodeB

1506 — SHARED CHANNEL (PUSCH) ALLOCATED?

NO → TRANSMIT CONTROL INFORMATION USING CONTROL CHANNEL
1508

YES

1510 — MAP PRIORITY INFORMATION TO SYMBOL(S) ADJACENT TO RS SYMBOL

1512 — TRANSMIT PRIORITY INFORMATION AND OTHER INFORMATION USING SHARED CHANNEL

DATA AND CONTROL MULTIPLEXING IN PUSCH IN WIRELESS NETWORKS

This application is a continuation of U.S. Non-Provisional application Ser. No. 16/665,777 filed Oct. 28, 2019, which is a continuation of U.S. Non-Provisional application Ser. No. 15/371,015 filed Dec. 6, 2016, now U.S. Pat. No. 10,461,893, which is a continuation of U.S. Non-Provisional application Ser. No. 13/491,155 filed Jun. 7, 2012, now U.S. Pat. No. 9,516,663, which is a continuation of U.S. Non-Provisional application Ser. No. 12/364,499 filed Feb. 2, 2009, now U.S. Pat. No. 8,223,808, which claims priority to and incorporates by reference U.S. Provisional Application No. 61/026,215, filed on Feb. 5, 2008 entitled "Considerations on Data and Control Multiplexing on PUSCH." The entire content of each of the above-mentioned applications is incorporated herein by reference.

FIELD OF THE INVENTION

Embodiments of this invention generally relate to wireless communications, and examples of embodiments can be applied in cellular communication systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as terminal or mobile station, may be fixed or mobile device and may be a wireless device, a cellular phone, a personal digital assistant (PDA), a wireless modem card, and so on. Uplink communication (UL) refers to a communication between the mobile UE and the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB. Embodiments of the invention, however, can be applied even beyond such cellular networks, since only concepts of wireless transmission and reception are needed. Nevertheless, the present invention will be described in the context of a cellular network.

Control information bits are transmitted, for example, in the uplink (UL), for several purposes. For instance, Downlink Hybrid Automatic Repeat ReQuest (HARQ) requires at least one bit of ACK/NACK transmitted information in the uplink, indicating successful or failed circular redundancy check(s) (CRC). Furthermore, an indicator of downlink channel (CQI) needs to be transmitted in the uplink to support mobile UE scheduling in the downlink. While CQI may be transmitted based on a periodic or triggered mechanism, the ACK/NACK needs to be transmitted in a timely manner to support the HARQ operation. Note that ACK/

NACK is sometimes denoted as ACKNAK or just simply ACK, or any other equivalent term. As seen from this example, some elements of the control information should be provided additional protection, when compared with other information. For instance, the ACKNACK information is typically required to be highly reliable in order to support an appropriate and accurate HARQ operation. This uplink control information is typically transmitted using the physical uplink control channel (PUCCH), as defined by the 3GPP working groups (WG), for evolved universal terrestrial radio access (EUTRA). The EUTRA is sometimes also referred to as 3GPP long-term evolution (3GPP LTE). For said reasons, structure of the PUCCH provides for sufficiently high transmission reliability.

In addition to PUCCH, the EUTRA standard also defines a physical uplink shared channel (PUSCH), intended for transmission of uplink user data. The Physical Uplink Shared Channel (PUSCH) can be dynamically scheduled. This means that time-frequency resources of PUSCH are re-allocated every sub-frame. This (re)allocation is communicated to the mobile UE using the Physical Downlink Control Channel (PDCCH). Alternatively, resources of the PUSCH can be allocated semi-statically, via the mechanism of persistent scheduling. Thus, any given time-frequency PUSCH resource can possibly be used by any mobile UE, depending on the scheduler allocation. Physical Uplink Control Channel (PUCCH) is different than the PUSCH, and the PUCCH is used for transmission of uplink control information (UCI). Frequency resources which are allocated for PUCCH are found at the two extreme edges of the uplink frequency spectrum. In contrast, frequency resources which are used for PUSCH are in between. Since PUSCH is designed for transmission of user data, re-transmissions are possible, and PUSCH is expected to be generally scheduled with less stand-alone sub-frame reliability than PUCCH.

The concept of a reference signal (RS) is important for some embodiments of the present invention. The RS is a pre-defined signal, pre-known to both transmitter and receiver. Typically, the transmitted RS signal carries no information. At times though, this requirement can be slightly relaxed, and, the transmitted RS signal can actually carry some small amount of information, in comparison to other signals. Still, for purposes of describing the Present Invention, the RS can mostly be thought as deterministic from the perspective of both transmitter and receiver. The RS is typically transmitted in order for the receiver to estimate the signal propagation medium. This process is also known as "channel estimation." Thus, RS can be transmitted to facilitate channel estimation. Upon deriving channel estimates, these estimates are used for demodulation of transmitted information. As common in the literature, demodulation is a process of recovering information from the modulated (and transmitted) signal. This type of RS is sometimes referred to as De-Modulation RS or DM RS. Note that RS can also be transmitted for other purposes, such as channel sounding, synchronization, or any other purpose. Also note that Reference Signal (RS) can be sometimes called the pilot signal, or the training signal, or any other equivalent term.

Turbo codes are a class of high-performance error correction codes developed in 1993 which are finding use in deep space satellite communications and other applications where designers seek to achieve maximal information transfer over a limited-bandwidth communication link in the presence of data-corrupting noise. The channel coding scheme for transport blocks in LTE is Turbo Coding with a coding rate of $R=\frac{1}{3}$, using two 8-state constituent encoders and a contention-free quadratic permutation polynomial (QPP) turbo code internal interleaver. Trellis termination is used for the turbo coding. Before the turbo coding, transport blocks are segmented into byte aligned segments with a maximum information block size of 6144 bits. Error detection is supported by the use of 24 bit CRC. The $\frac{1}{3}$ coding rate triples the bit-count for transmission of the block. The general operations of channel coding are described in the EUTRA specifications, for example: "$3^{rd}$ Generation Partnership Project; Technical Specification Group Radio Access Network; Evolved Universal Terrestrial Radio Access (E-UTRA); Multiplexing and channel coding (TS36.212, Release 8)."

The 3GPP working groups are developing a set of standards. 3GPP TS 36.211, "$3^{rd}$ Generation Partnership Project; Technical Specification Group Radio Access Network; Evolved Universal Terrestrial Radio Access (E-UTRA); Physical Channels and Modulation (Release 8)" defines aspects of the physical channels and modulation. 3GPP TS 36.212 "$3^{rd}$ Generation Partnership Project; Technical Specification Group Radio Access Network; Evolved Universal Terrestrial Radio Access (E-UTRA); Multiplexing and channel coding (Release 8)" defines aspects of multiplexing and channel coding. Both of these documents as well as other 3GPP standards are evolving over time as the working groups add new concepts and definitions.

BRIEF DESCRIPTION OF THE DRAWINGS

Particular embodiments in accordance with the invention will now be described, by way of example only, and with reference to the accompanying drawings:

FIG. 13 is a flow diagram illustrating uplink transmission in the network system of FIG. 12;

FIG. 14 is a flow diagram illustrating another embodiment of uplink transmission in the network of FIG. 12.

DETAILED DESCRIPTION OF EMBODIMENTS OF THE INVENTION

Figure 1:
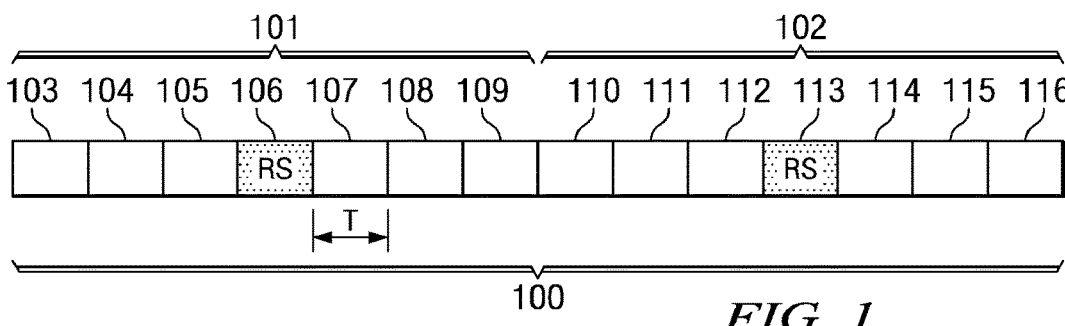
FIG. 1 is an illustrative format of an up-link transmission PUSCH channel for use in the network of FIG. 12.

Certain disclosed embodiments of the present invention include apparatus and methods for transmitting and receiving elements of uplink control information (UCI) on physical uplink shared channel (PUSCH), even in scenarios where PUCCH is actually configured and allocated to a user. In some embodiments of the invention, transmission is made in such a manner that elements of control information are transmitted either on a PUCCH when no other data is available for transmission; otherwise, transmission is made on the PUSCH. By only using one channel at any given time, peak-to-average power ratio (PAPR) is maintained at lower levels.

In the prior art, the PUSCH is designed to principally transport the uplink (UL) user data information. This user data information arrives via transport channels (TrCH), and transport channels are services offered by Physical Layer to higher layers. Thus, user data, which arrives from higher layers, is transported by transport channels. Physical Channels, in contrast, are actually a part of the Physical Layer. Consequently, in the prior art, the PUSCH only serves to provide services to the Uplink Shared Channel (UL-SCH), which is a transport channel (TrCH). In the prior art, the uplink control information is carried by a Physical Uplink Control Channel (PUCCH). Note that, as said earlier, the PUCCH is physical channel which is different from PUSCH, in a number of aspects, including: structure, resource allocation, and time-frequency resources.

In contrast to prior art, embodiments of the present invention incorporate transmission of elements of the Uplink Control Information (UCI) using the PUSCH, even if PUCCH resources may be allocated to a mobile UE. In addition to this, the present invention also describes specifically which PUSCH resources are used to carry elements of the UCI. In order to do so, the present invention first introduces a broader concept of Prioritized Information. Prioritized Information can contain elements of UCI which require additional (or high) transmission reliability.

Prioritized Information can be regarded as the type of information which should be provided higher transmission reliability (in a given stand-alone sub-frame) when compared with the rest of transmitted information. For example, elements of the uplink control information (UCI) can be regarded as Prioritized Information. Since elements of UCI are critical for maintenance of reliable uplink and downlink channels, the UCI should have better protection than Other Information. For this reason, when designing a PUSCH sub-frame structure, where Prioritized Information is multiplexed with other Information, the Prioritized Information should be positioned in the vicinity of the Reference Signal (RS). Thus, channel estimates which are applied to the Prioritized Information are very accurate. Consequently, Prioritized Information (PI) is provided with a sufficient amount of protection. For example, especially in the scenario where the mobile moves with a relatively high velocity, the channel still maintains coherence from the time of transmission and/or reception of the RS to the time of transmission and/or reception of the Prioritized Information. Thus, Prioritized Information (PI) is provided with a needed protection in terms of having accurate channel estimates.

Prioritized Information can comprise elements of Layer 1 (L1) and Layer 2 (L2) Control Information. The Prioritized Information can also comprise elements of uplink control information (UCI). More specifically, the Prioritized Information can include ACKNAK (or ACKNACK) feedback, CQI information, Rank Information, PMI information, UE buffer status, UE power status, scheduling request indicator, new data indicator (NDI), or any other L1 and/or L2 control information. Note that certain elements of L1 and L2 control information may not need the said additional protection, and consequently, these do not need to be provisioned as a Prioritized Information. However, the elements or L1 and L2 information which do require the additional protection are provisioned to be Prioritized Information and will be placed in the vicinity of the RS.

The ACKNAK information is the feedback which is sent by the mobile UE to the NodeB, in support of the downlink hybrid automatic repeat request (DL HARQ). The DL HARQ operates as follows. The NodeB transmits a sub-frame or packet of data to the mobile UE, where the sub-frame contains error detection capability, via circular redundancy check (CRC). The UE then decodes the said sub-frame, and performs error detection. If CRC passes, the mobile UE transmits an ACK to the NodeB, thus informing the NodeB of a successful transmission. However, if CRC fails, the mobile UE transmits a NACK (or NAK) to the NodeB, thus informing the NodeB of a transmission failure. Thus, the described feedback (mobile UE to NodeB) is sometimes denoted as ACKNACK or ACKNAK feedback, and is an element of L1/L2 control information. It is generally understood that ACKNACK has to be transmitted with a high reliability. Thus, it is recommended that ACKNACK be mapped in symbols which are adjacent to the RS. The ACKNACK information is a part of uplink control information (UCI). Thus, in some embodiments, the ACKNAK information can be considered to be a Prioritized Information.

In some embodiments of the invention, a symbol is an OFDM symbol. A symbol can be set of digital samples. A symbol can be a set of discrete samples. In some embodiments of the invention, a symbol is preceded by a cyclic prefix transmission. Consecutive symbols are symbols which occur one after another. In some embodiments of the invention, there are no time gaps between consecutive symbols. In some embodiments of the invention, gaps between consecutive symbols are due to cyclic prefix (CP). In some embodiments of the invention, gaps between consecutive symbols are due to guard time.

Channel Quality Indicator (CQI) is obtained by measuring the quality of the downlink (DL) channel, or downlink channels. The measured quality of the DL channel(s) can be fed back (i.e. transmitted), by the mobile UE, to the NodeB. The CQI information is a part of uplink control information (UCI). Thus, in some embodiments, the CQI information can be considered to be a Prioritized Information. Rank information is applicable for MIMO signaling, and CQI is related to the Rank Information. The Rank information can describe, up to a certain precision, and in some embodiments, the matrix rank of the MIMO downlink channel. The Rank information is a part of uplink control information (UCI). Thus, in some embodiments, the Rank information can be considered to be a Prioritized Information. Pre-coder matrix index (PMI) is a type of information by which the receiver indicates (or suggests), to the transmitter, which pre-arranged transmit MIMO pre-coder should be used. Thus, in some embodiments, the PMI information can be considered to be a Prioritized Information. Note that Rank Information can be termed Rank Indicator, Rank Indication, or any other equivalent term. In some embodiments of the invention, Rank Indication is a feedback sent from the mobile UE to the NodeB, suggesting (implicitly or explicitly) the number of Layers in MIMO transmission.

Scheduling request indicator (SRI) is a type of information which indicates that the mobile UE requests an UL transmission of a certain quantity of data. Then, scheduling request may or may not be attended to by the NodeB. In some embodiments, the SRI information can be considered to be a Prioritized Information.

Certain status of the mobile UE can also be prioritized. For instance, in some embodiments, the type of information by which the mobile UE informs the NodeB of its buffer status, can be made a Priority Information. In some embodiments, the type of information by which the mobile UE informs the NodeB of its power status, can be made a Priority Information. In some embodiments, the type of information by which the mobile UE informs the NodeB of its battery status, can be made a Priority Information. Also, in some embodiments, data-associated UL control information can be made a Priority Information as well. The data-associated UL control information is a type of information which is associated with the UL data. For example, the modulation and coding information (which applies to the current PUSCH) can be considered to be data-associated control information.

Another aspect of prioritization is that control information can be assigned priority levels. For example, ACKNAK can have the highest priority level (e.g. level 0). CQI can have a lower priority level, etc. Note that certain control information can have same priority levels. For example, it would be possible to make ACKNAK and SRI have the same priority level (e.g. level 0), since both them need to be received in a timely fashion with high detection performance.

Prioritized control information can be mapped surrounding the DM RS in decreasing order of priority. For instance, ACKNAK can be immediately surrounding the RS. Then, the next can be SRI, which is then surrounding the ACKNAK information, etc. In general, information of priority level n is surrounding the information of priority level n−1. However, if certain two kinds of information are assigned identical priority levels, then they can be interleaved. In a first embodiment, the order of priority may be as follows: ACKNAK has the priority 0, SRI has the priority 1, and Rank has the priority 2, and CQI has priority 3. In another embodiment, the order of priority may be as follows: ACKNAK has the priority 0, Rank has the priority 1, and CQI has priority 2, when SRI is encoded separately. In yet another embodiment, the order of priority may be as follows: ACKNAK has the priority 0, Rank has the priority 1, and SRI and CQI may be treated separately. Thus, the sequence of mapping this information surrounding the RS is determined based on the priority levels. In some embodiments of the invention, ACKNAK has the priority 0 and Rank has priority 1.

Figure 12:
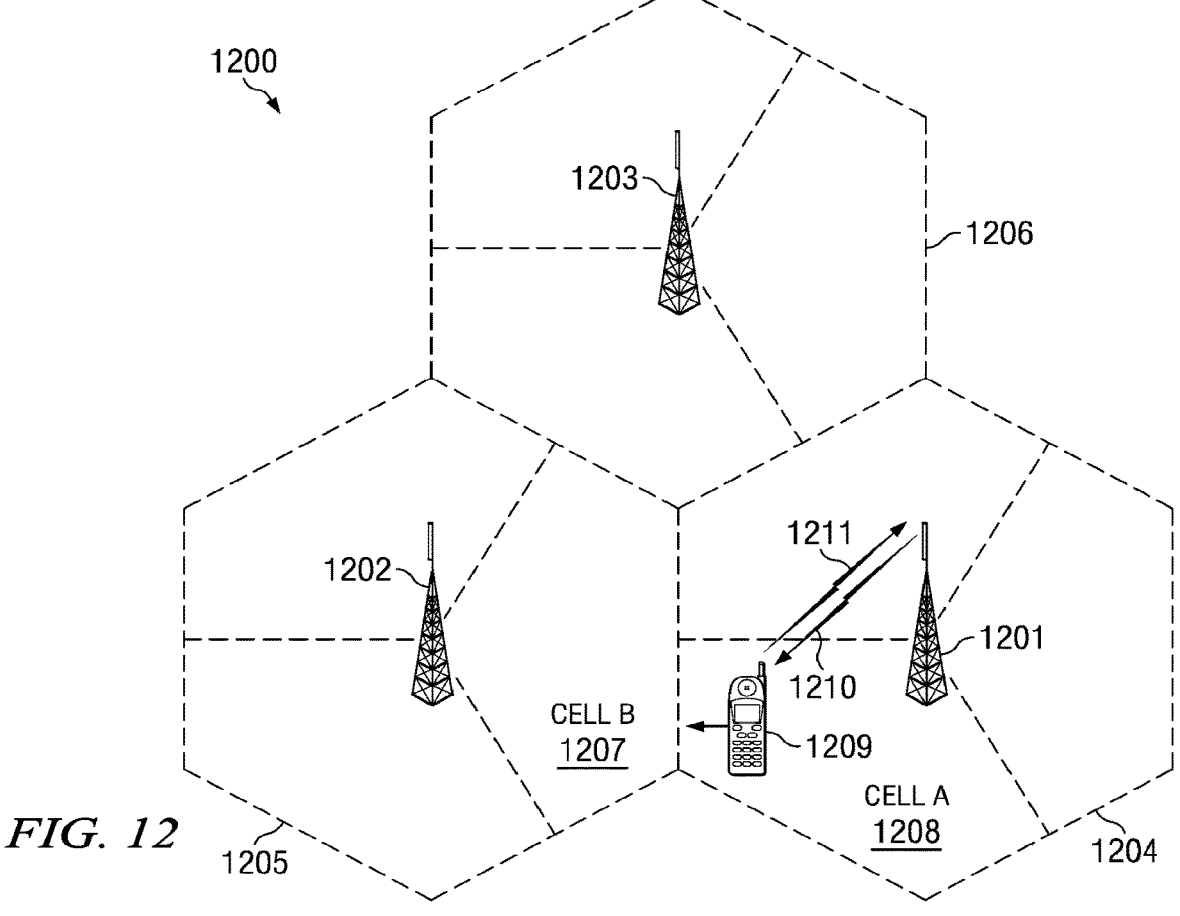
FIG. 12 is a pictorial of an illustrative telecommunications network that supports transmission of uplink channels with prioritized symbols.

FIG. 12 shows an illustrative wireless telecommunications network 1200 that supports transmission of uplink channels with prioritized symbols. The illustrative wireless telecommunications network includes NodeBs (base stations) 1201, 1202, and 1203, though in operation, a telecommunications network may include more NodeBs or fewer NodeBs. Each of NodeBs 1201, 1202, and 1203 is operable over corresponding coverage areas 1204, 1205, and 1206. Each NodeBs coverage area can be further divided into cells. In the illustrated network, each NodeBs coverage area is divided into three cells. Handset or other UE 1209 is shown in Cell A (labeled 1208), which is within coverage area base station 1201. Base station 1201 is transmitting to and receiving transmissions from UE 1209. As UE 1209 moves out of the Cell A (1208), and into Cell B (1207), UE (1209) may be handed over to base station 1202.

FIG. 1 is an illustrative format of an UL transmission 1210 for use in the network of FIG. 12. Elements of the present invention will be described in the context of EUTRA sub-frame, even though its applicability is broader. FIG. 1 describes transmission of EUTRA sub-frame 100 (could be same as 1210) comprising two slots 101 and 102. Duration of the EUTRA sub-frame is 1 ms, which means that duration of two slots 101 and 102 is 0.5 ms each. Each slot comprises 7 symbols. For example, slot 101 comprises symbols 103, 104, 105, 106, 107, 108, 109. The slot 102 comprises symbols 110, 111, 112, 113, 114, 115, 116. Symbols 106 and

113 are Demodulation (DM) Reference Signals (RS), and are used to derive channel estimates which are needed for coherent demodulation of the remaining Symbols. In addition to 106 and 113, there may be, at times other RS, which are the sounding RS. Sounding RS can be configured by the NodeB. Position of the sounding RS is debated but most likely it will be either at the start or the beginning of the first and the second slot. Each symbol has a time duration equal to approximately T, which is a function of the slot time. In this embodiment, the slot time is 500 μsec. Since the first symbol in the slot has more cyclic prefix samples, not all symbols are exactly equal in duration, as per 3GPP TS36.211. Nevertheless, all symbols can be considered to be approximately equal in duration, which doesn't exceed 75 μsec. Note that if all symbols were exactly equal in duration, the symbol time T would approximately be equal to 500 μsec/7=71.4 μsec.

Figure 2:
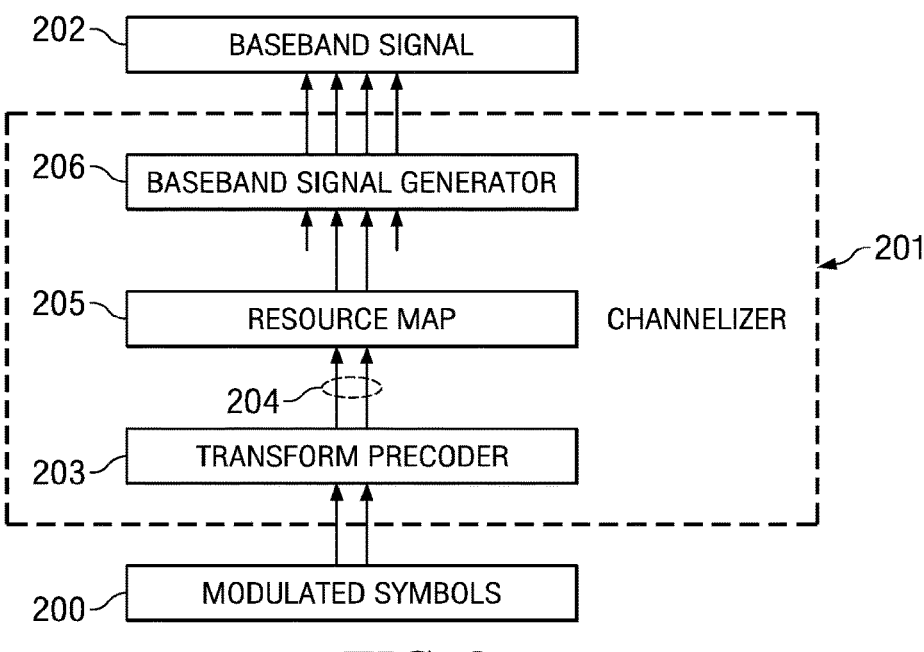
FIG. 2 is a block diagram of a Channelizer that forms a signal for transmission using the format of FIG. 1.

FIG. 2 is a block diagram which illustrates operation of a Channelizer 201 that can be used to form symbols of the sub-frame in FIG. 1. A number of symbols (non-RS) of the sub-frame 100 can be generated using the Channelizer in FIG. 2. The Channelizer of FIG. 2 begins with complex modulated samples, which can belong to a constellation such as BPSK, QPSK, 8-PSK, 16 QAM, 64 QAM or some other constellations. This however, is not mandatory. Modulated Symbols 200 can be transformed by the Transform Pre-Coder 203. One example of the Transform Pre-Coder 203 is $$z[k]=\beta\Sigma_i d[i] \exp(-j2\pi ki/L),$$

where sum $\Sigma_i$ extends across all indexes "i" in $\{0, 1, \ldots, L-1\}$, where "j" is the complex unit, where $\pi$ is the well-known constant (approximately 3.14), where d[i] are symbols of the sequence 200 which enters the Transform Pre-Coder 203, where "L" is the length of both the sequence which enters (200) and the sequence which is outputted (204) by the Transform Pre-Coder 203, where $\beta$ is a normalization constant (e.g. inverse square root of L). Note the "L" can be the number of tones allocated on PUSCH, for this particular mobile UE. In some embodiments, the Transform Pre-Coder 203 can be implemented using a Discrete Fourier Transform (DFT). Transform Pre-Coder 203 is coupled to the Resource Map 205, which describes the set of PUSCH tones which are allocated to the UE for the present sub-frame. Resource Map 205 is coupled with the Baseband Signal Generator 206. Thus, the Resource Map 205 maps said samples z[k] onto a[m], which is the input to the Baseband Signal Generator. Thus, in some embodiments, sequence of a[m] contains samples of the sequence z[k], along with some other possible samples (e.g. zero-insertion). One possible embodiment of the Baseband Signal Generator 206 is given by the formula $$s(t)=\Sigma_m a[m+c] \exp[j2\pi(m+\frac{1}{2})(t-N_{CP}T_s)\Delta f],$$

where the sum $\Sigma_m$ ranges over m. In accordance to the 3GPP specification TS36.211, as $T_s=1/(15000\times2048)$ where "×" is just multiplication. Here, $\Delta f$ is 15 kHz. Here, $N_{CP}$ is the number of Cyclic Prefix (CP) samples, which can be transmitted for every symbol, as common in OFDM-based systems. Also note that $N_{CP}$ can be symbol-dependent. Here, t is the continuous-time variable whose range is as $0 \le t \le (N+N_{CP})T_s$ where N=2048. Here, sequence a[m+c] is assumed to have M non-zero elements. Here, c is just an offset, which can be equal, for example, to floor(M/2). In this case, the sum $\Sigma$ ranges over "m" inside the set $\{-floor(M/2), -floor(M/2)+1, \ldots, ceil(M/2)-1\}$, where floor is the known "floor" function and "ceil" is the known ceiling function.

Note that "m+½" in the above sum performs a frequency offset of ½ tone, implemented in the baseband, for purpose of DC-offset mitigation of the Direct Conversion problem. Note that this is just an embodiment of the Baseband Signal Generator 206, and other embodiments, which different specific numbers are possible. Thus, different modifications to the Baseband Signal Generator 206 are possible, which don't affect the scope of the Present Invention. Components of the Baseband Signal Generator can be implemented using the Inverse Discrete Fourier Transform (IDFT).

Figure 3:
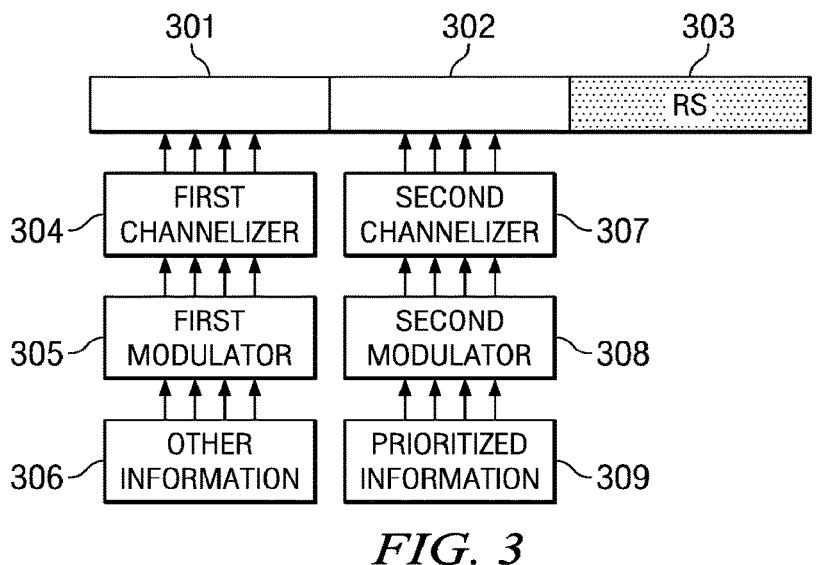
FIGS. 3-9 are flow diagrams illustrating various ways of forming an uplink signal using the format of FIG. 1.

FIG. 3-FIG. 9 are diagrams illustrating various ways of forming a signal using the format of FIG. 1. In some embodiments, the Prioritized Information can occupy one or more symbols which are adjacent to the RS, as shown in FIG. 3. In FIG. 3 the Prioritized information 309 is modulated with a Second Modulator 308, while the Other Information is modulated with the First Modulator 305. Note that First Modulator 305 and Second Modulator 308 can be the same, or they can be different. Simple examples of either Modulator (305 or 308) include BPSK, QPSK, 8-PSK, 16 QAM, 64 QAM, sequence modulation, or any other digital modulation techniques. However, note that neither First Modulator 305, nor the Second Modulator 308, are necessarily confined to these listed options. Also note that elements of Other Information in FIG. 3 can be prior encoded, or not. Also note that elements of Prioritized Information 308 can be prior encoded or not. First Modulator 305 is coupled to the First Channelizer 304, which produces baseband signal 301. One embodiment of the First Channelizer 304 is the described Channelizer 221 in FIG. 2. Other embodiments of the First Channelizer are possible. Second Modulator 308 is coupled to the Second Channelizer 307, which also produces baseband signal 302. One embodiment of the Second Channelizer 307 is the described Channelizer 221 in FIG. 2. Other embodiments of the First Channelizer are possible. For instance, the DFT pre-coder could be omitted in some embodiments. Note that, in FIG. 3, the Prioritized Information 309 is transmitted in the symbol 302, which is adjacent to the RS symbol 303. Other Information can be mapped (in 301) away from the RS symbol 303, and are thus given less protection.

Figure 4:
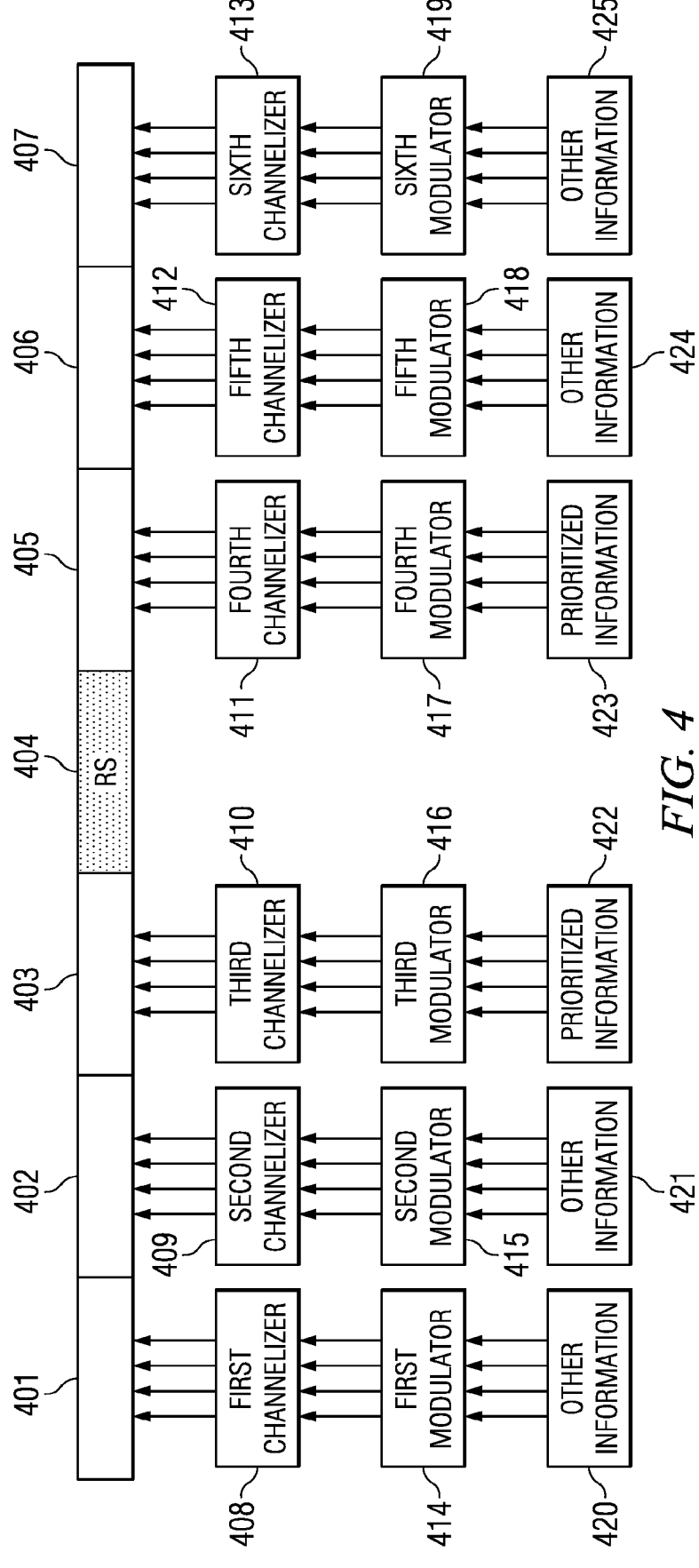

FIG. 4 shows a PUSCH transmission slot in accordance with an embodiment of the invention. In FIG. 4, the slot is the PUSCH 3GPP EUTRA slot, with a described timing structure as described above. In FIG. 4, elements of the Prioritized Information are modulated with a corresponding Modulator. In particular, Prioritized Information 422 is modulated with Third Modulator 416 while Prioritized Information 423 is modulated with the Fourth Modulator 417. Note that Prioritized Information 422 and Prioritized Information 423 could be prior encoded which means that both arrive from one channel encoder. In some embodiments, 422 and 423 can even be the same. Similarly, Other Information 420, 421, 424 and 425 can also be prior encoded, where 420, 421, 424 and 425 arrive from one channel encoder. Modulators 414, 415, 416, 417, 418 and 419 can be selected from BPSK, QPSK, 8-PSK, 16 QAM, 64 QAM, sequence modulation, or any other digital modulation techniques. This, however, is not mandatory. Channelizers 408, 409, 410, 411, 412, and 413 can be the described Channelizer 221 in FIG. 2. Note that other embodiments of Channelizers are possible, including variations of 221, such as removing the Transform Precoder. Note that, in FIG. 4, the Prioritized Information 422 is transmitted in the symbol 403, which is adjacent to the RS symbol 404. Similarly, the Prioritized Information 423 is transmitted in the symbol 405, which is adjacent to the RS symbol 404.

Thus, the FIG. 4 can represent a slot structure for joint transmission of Control Information and other Information on the physical uplink shared channel (PUSCH).

Figure 5:
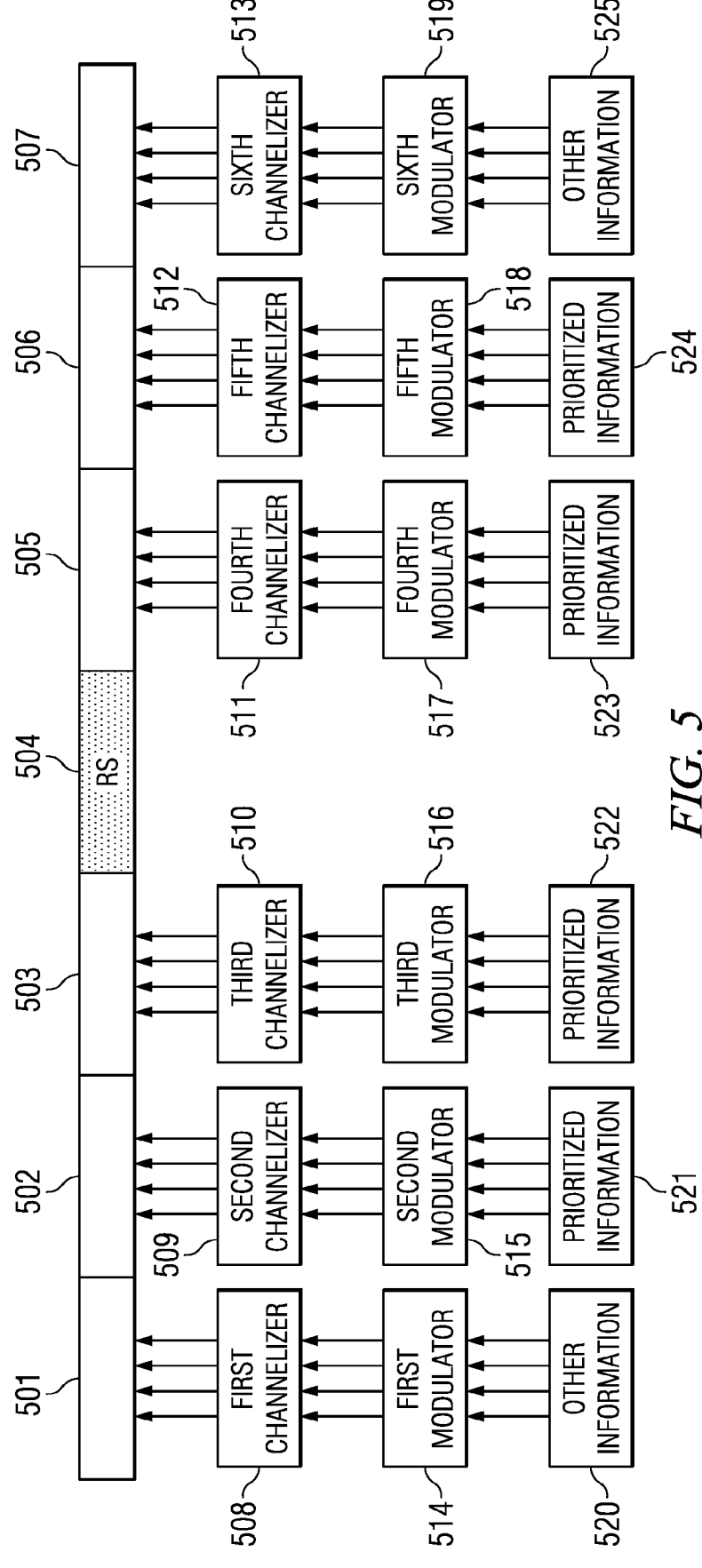

FIG. 5 shows a PUSCH transmission slot in accordance with another embodiment of the invention. In FIG. 5, the slot is the PUSCH 3GPP EUTRA slot, with a described timing structure as described in the introduction. In FIG. 5, elements of the Prioritized Information are modulated with a corresponding Modulator. In particular, Prioritized Information 521 is modulated with the Second Modulator 515; Prioritized Information 522 is modulated with Third Modulator 516; Prioritized Information 524 is modulated with Fifth Modulator 518; and Prioritized Information 523 is modulated with the Fourth Modulator 517. Note that Prioritized Information 521, 522, 523 and 524 could be prior encoded which means that all arrive from one channel encoder. In some embodiments, 521, 522, 523 and 524 can even be the same. Similarly, Other Information 520, 525 can also be prior encoded, where 520 and 525 arrive from one channel encoder. Modulators 514, 515, 516, 517, 518 and 519 can be selected from BPSK, QPSK, 8-PSK, 16 QAM, 64 QAM, sequence modulation, or any other digital modulation techniques. This, however, is not mandatory. Channelizers 508, 509, 510, 511, 512, and 513 can be the described Channelizer 221 in FIG. 2. Note that other embodiments of Channelizers are possible, including variations of 221, such as removing the Transform Precoder. Note that, in FIG. 5, the Prioritized Information 522 is transmitted in the symbol 503, which is adjacent to the RS symbol 504. Similarly, the Prioritized Information 523 is transmitted in the symbol 505, which is adjacent to the RS symbol 504. In addition, note that Prioritized Information 521 is transmitted in the symbol 502, which is second-adjacent to the RS symbol, and Prioritized Information 524 is transmitted in the symbol 506, which is also second-adjacent to the RS symbol 504. This is tolerable since the second-adjacent symbol to the RS still maintains a substantial amount of channel coherence from the RS. Thus, in certain cases, it is possible to use the second-adjacent symbol to the RS. Thus, the FIG. 5 can represent a slot structure for joint transmission of Control Information and other Information on the physical uplink shared channel (PUSCH).

Figure 6:
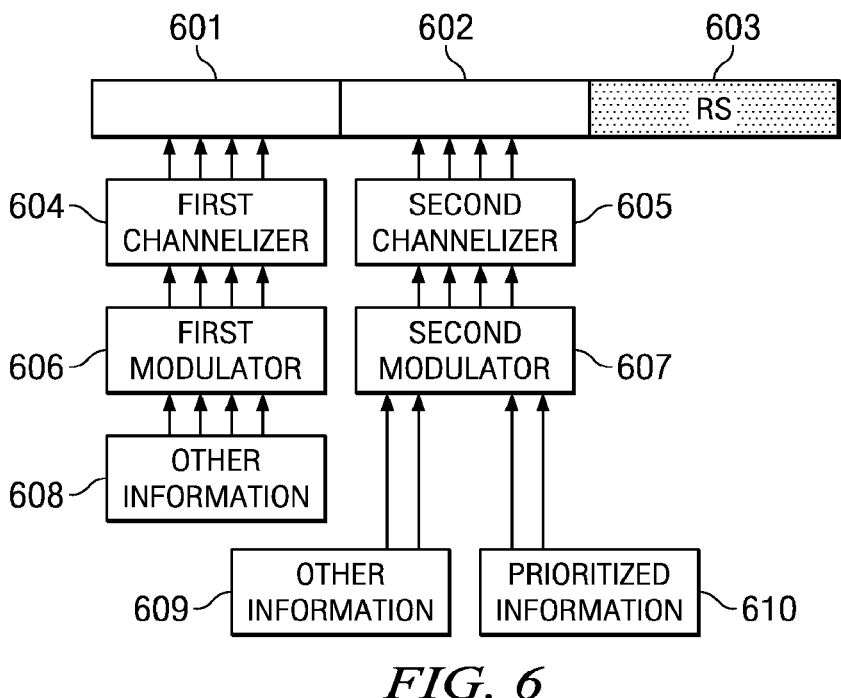

In some embodiments, the Prioritized Information occupies fraction(s) of one or more symbols which are adjacent to the RS, as shown in FIG. 6. In FIG. 6 the Prioritized Information 610 and the Other Information 609 are mapped to one symbol, namely the symbol 602. Note that Prioritized Information 610 and Other Information 609 both pass through the Second Modulator 607, which is coupled to the Second Channelizer 605. Second Channelizer 605 can be the described Channelizer 221 in FIG. 2, or a variation thereof. First Channelizer 604 can be the described Channelizer 221 in FIG. 2, or a variation thereof. Simple examples of First Modulator 606 include BPSK, QPSK, 8-PSK, 16 QAM, 64 QAM, sequence modulation, or any other digital modulation techniques. Similar holds for the Second Modulator 607. However, note that the 607 is used to Modulate together both Other Information 609 and the Prioritized Information 610.

Figure 7:
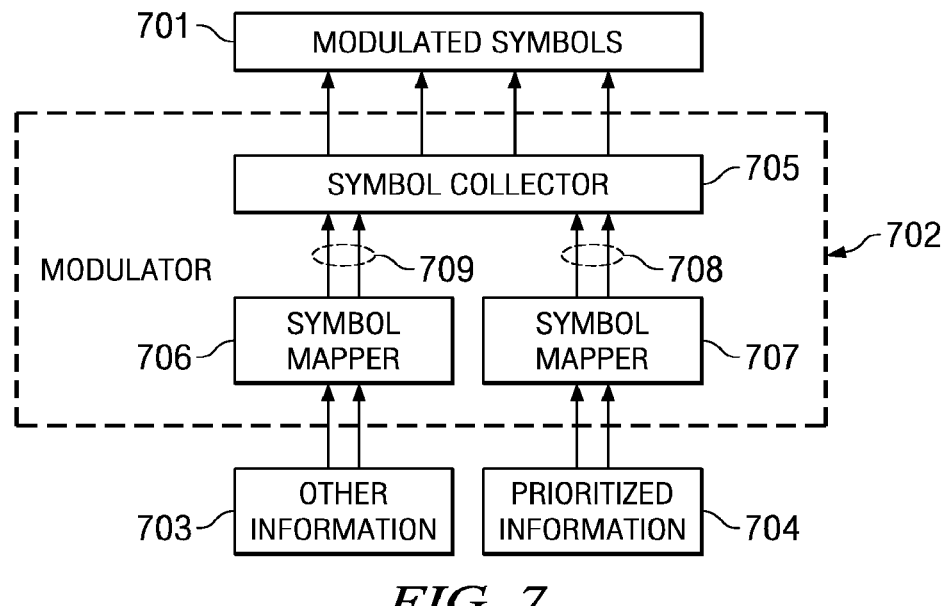

A possible embodiment of Second Modulator 607 is shown in 702 of FIG. 7. In 702, the Other Information 703 is mapped to complex samples 709 using Symbol Mapper 706, while the Prioritized Information 704 is mapped to complex samples 708 using Symbol Mapper 707. Symbol Mappers 706 and 707 can be simple BPSK, QPSK, 8-PSK, 16 QAM, 64 QAM, sequence modulation, or any other digital modulation techniques. Collection of complex samples from 708 and 709 is performed using Symbol Collector 705. In some embodiments, the Symbol Collector 705 is used to simply multiplex the Mapped Priority Information 708 and Mapped Other Information 709. This multiplexing can be performed in a number of different conventions. For example, in some embodiments, Symbol Collector 705 can simply append the Mapped Priority Information 708 at the end of the Mapped Other Information 709. In other embodiments, Symbol Collector 705 can simply append the Mapped Other Information 709 at the end of the Mapped Priority Information 708. In other embodiments, Symbol Collector 705 can simply interlace the Mapped Other Information 709 and the Mapped Priority Information 708. Note that other operations of a Symbol Collector 705, according to some pre-arranged convention are not precluded. Thus in FIG. 7, the Mapped Other Information 709 and the Mapped Priority Information 708 are Collected using the Symbol Collector 705 to produce Modulated Samples 701. Thus, FIG. 7 shows a possible operation of the Second Modulator 607. Modulated Samples go through the Second Channelizer 605, which produces baseband signal 602. Thus, in FIG. 6, the Prioritized Information 610 is carried on baseband signal 602, which are adjacent to baseband reference signal 603.

Figure 8:
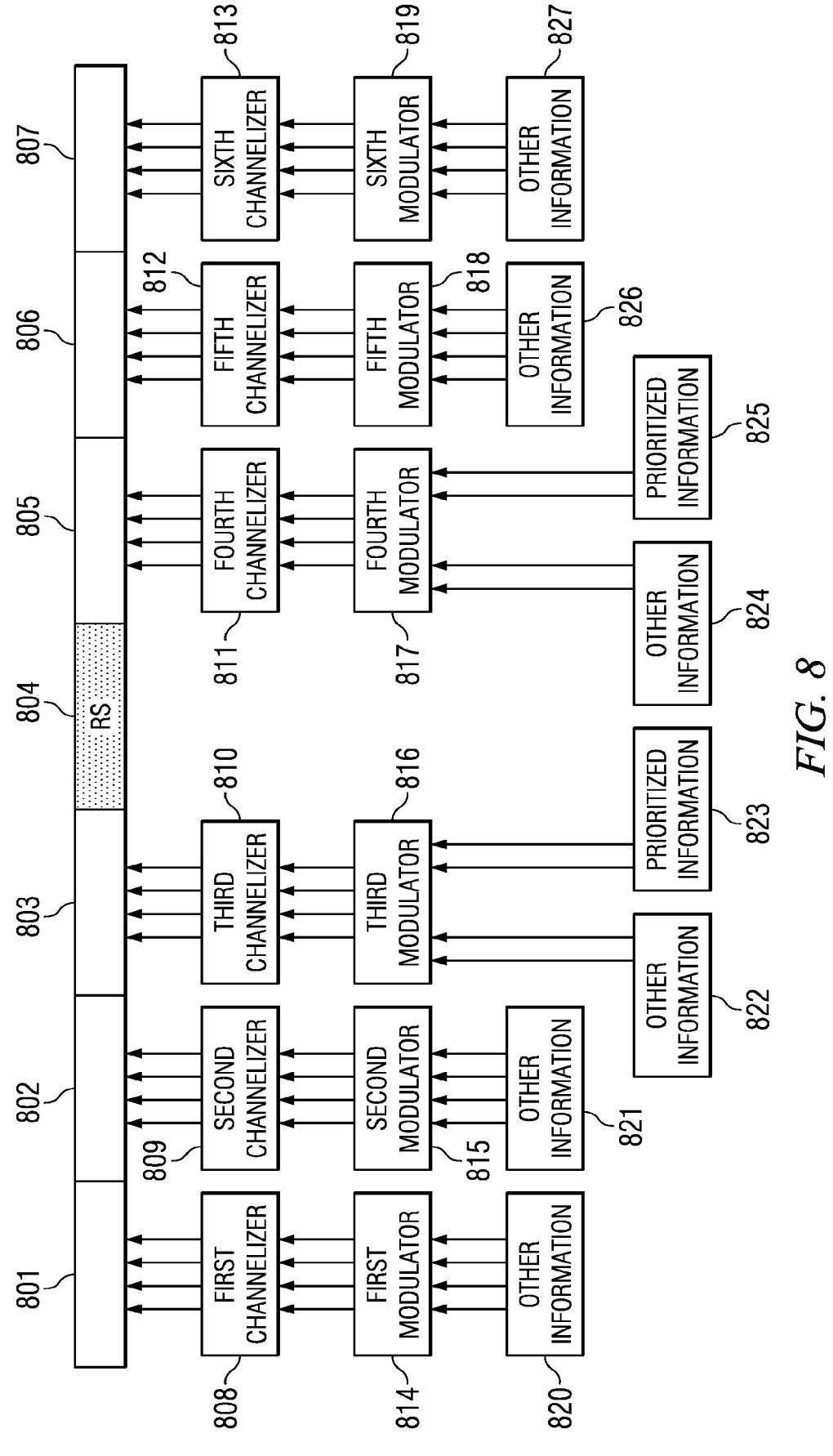

FIG. 8 shows a PUSCH transmission slot in accordance with another embodiment of the invention. In FIG. 8, the slot is the PUSCH 3GPP EUTRA slot, with a described timing structure as described in the introduction. Note that in FIG. 8, the Prioritized Information 823 is carried on baseband signal 803, while the Prioritized Information 825 is carried on baseband signal 805. Since baseband signals 823 and 825 surround the baseband RS signal in 824, the Prioritized Information 823 and 825 is given protection in high-mobility environments. However, also note that baseband signal 803 also carry elements of Other Information 822, as shown in FIG. 8. Similarly, baseband signal 805 also carries elements of Other Information 824, as shown in FIG. 8. Thus, in FIG. 8, the Third Modulator 816 is used to Modulate together both Other Information 822 and the Prioritized Information 823. Similarly, the Fourth Modulator 817 is used to Modulate together both Other Information 824 and the Prioritized Information 825. A Possible embodiment of the Third Modulator 816 and the Fourth Modulator 817 is shown by 702 of FIG. 7. In 702, the Other Information 703 is mapped to complex samples 709 using Symbol Mapper 706, while the Prioritized Information 704 is mapped to complex samples 708 using Symbol Mapper 707. Symbol Mappers 706 and 707 can be simple BPSK, QPSK, 8-PSK, 16 QAM, 64 QAM, sequence modulation, or any other digital modulation techniques. Collection of complex samples from 708 and 709 is performed using Symbol Collector 705. In some embodiments, the Symbol Collector 705 is used to simply multiplex the Mapped Priority Information 708 and Mapped Other Information 709. This multiplexing can be performed in a number of different conventions. For example, in some embodiments, Symbol Collector 705 can simply append the Mapped Priority Information 708 at the end of the Mapped Other Information 709. In other embodiments, Symbol Collector 705 can simply append the Mapped Other Information 709 at the end of the Mapped Priority Information 708. In other embodiments, Symbol Collector 705 can simply interlace the Mapped Other Information 709 and the Mapped Priority Information 708. Note that other operations of a Symbol Collector 705, according to some pre-arranged convention are not precluded. Thus in FIG. 7, the Mapped Other Information 709 and the Mapped Priority Information 708 are Collected using the Symbol Collector 705 to produce Modulated Samples 701. In FIG. 8, the Prioritized Information 823 and 825 could be prior-encoded which means that both arrive from one channel encoder. In some embodiments, 823 and 825 could even be identical. Similarly, Other Information 820, 821, 822, 824, 826 and 827 can also be prior encoded, where 820, 821, 822, 824, 826 and 827 all arrive from one channel coder. The encoding may be performed using a turbo encoder using known techniques. Modulators 814, 815, 818 and 819 can be selected from BPSK, QPSK, 8-PSK, 16 QAM, 64 QAM, sequence modulation, or any other digital modulation techniques. This, however, is not mandatory. Channelizers 808, 809, 810, 811, 812, and 813 can be the described Channelizer 221 in FIG. 2. Note that other embodiments of Channelizers are possible, including variations of 221, such as removing the Transform Precoder. Note that, in FIG. 8, the Prioritized Information 823 is transmitted in the symbol 803, which is adjacent to the RS symbol 804. Similarly, the Prioritized Information 825 is transmitted in the symbol 805, which is adjacent to the RS symbol 804. Thus, the FIG. 8 can represent a slot structure for joint transmission of Control Information and other Information on the physical uplink shared channel (PUSCH).

As discussed earlier control information can be assigned priority levels. For example, ACKNAK can have the highest priority level (e.g. level 0). Therefore, in one embodiment, prioritized information 823 and 825 is ACKNAK information. The ACK information may be encoded as follows: each positive acknowledgement (ACK) is encoded as a binary '1' and each negative acknowledgement (NAK) is encoded as a binary '0'. If ACK consists of 1-bit of information, i.e., $$\left[ o_0^{ACK} \right],$$

may be is encoded according to Table 1. If ACK consists of 2-bits of information, i.e., $$\left[ o_0^{ACK} o_1^{ACK} \right]$$

with $$o_0^{ACK}$$

corresponding to ACK/NACK bit for codeword 0 and $$o_1^{ACK}$$

corresponding to that for codeword 1, it may be encoded according to Table 2 where $$o_2^{ACK} = \left( o_0^{ACK} + o_1^{ACK} \right) \bmod 2.$$

TABLE 1

| Encoding of 1-bit ACK | |
| --- | --- |
| $Q_m$ | Encoded ACK |
| 2 | $[o_0^{ACK}\ y]$ |
| 4 | $[o_0^{ACK}\ y\ x\ x]$ |
| 6 | $[o_0^{ACK}\ y\ x\ x\ x\ x]$ |

TABLE 2

| Encoding of 2-bit ACK | |
| --- | --- |
| $Q_m$ | Encoded ACK |
| 2 | $[o_0^{ACK}\ o_1^{ACK}\ o_2^{ACK}\ o_0^{ACK}\ o_1^{ACK}\ o_2^{ACK}]$ |
| 4 | $[o_0^{ACK}\ o_1^{ACK}\ x\ x\ o_2^{ACK}\ o_0^{ACK}\ x\ x\ o_1^{ACK}\ o_2^{ACK}\ x\ x]$ |
| 6 | $[o_0^{ACK}\ o_1^{ACK}\ x\ x\ x\ x\ o_2^{ACK}\ o_0^{ACK}\ x\ x\ x\ x\ o_1^{ACK}\ o_2^{ACK}\ x\ x\ x\ x]$ |

The "x" and "y" in Table 1 and Table 2 are placeholders to scramble the ACK bits with other information 822, 824 in a way that maximizes the Euclidean distance of the modulation symbols carrying ACK information.

Similarly, if the highest priority information is rank indication (RI), the corresponding bit widths for rank indication feedback for PDSCH transmissions are given by Table 3 and Table 4. If RI consists of 1-bit of information, i.e., $$\left[ o_0^{RI} \right],$$

it may be encoded according to Table 3. If RI consists of 2-bits of information, i.e., $$\left[ o_0^{RI} o_1^{RI} \right]$$

with $$o_0^{RI}$$

corresponding to MSB of 2-bit input and $$o_1^{RI}$$

corresponding to LSB, it may be encoded according to Table 4 where $$o_2^{RI} = \left( o_0^{RI} + o_1^{RI} \right) \bmod 2.$$

TABLE 4

| Encoding of 1-bit RI | |
| --- | --- |
| $Q_m$ | Encoded RI |
| 2 | $[o_0^{RI}\ y]$ |
| 4 | $[o_0^{RI}\ y\ x\ x]$ |
| 6 | $[o_0^{RI}\ y\ x\ x\ x\ x]$ |

TABLE 4

Encoding of 2-bit RI

| $Q_m$ | Encoded RI |
|---|---|
| 2 | $[o_0^{RI} o_1^{RI} o_2^{RI} o_0^{RI} o_1^{RI} o_2^{RI}]$ |
| 4 | $[o_0^{RI} o_1^{RI} x x o_2^{RI} o_0^{RI} x x o_1^{RI} o_2^{RI} x x]$ |
| 6 | $[o_0^{RI} o_1^{RI} x x x x o_2^{RI} o_0^{RI} x x x x o_1^{RI} o_2^{RI} x x x x]$ |

The "x" and "y" in Table 3 and Table 4 are placeholders to scramble the RI bits with other information 822 824 in a way that maximizes the Euclidean distance of the modulation symbols carrying rank information.

Figure 9:
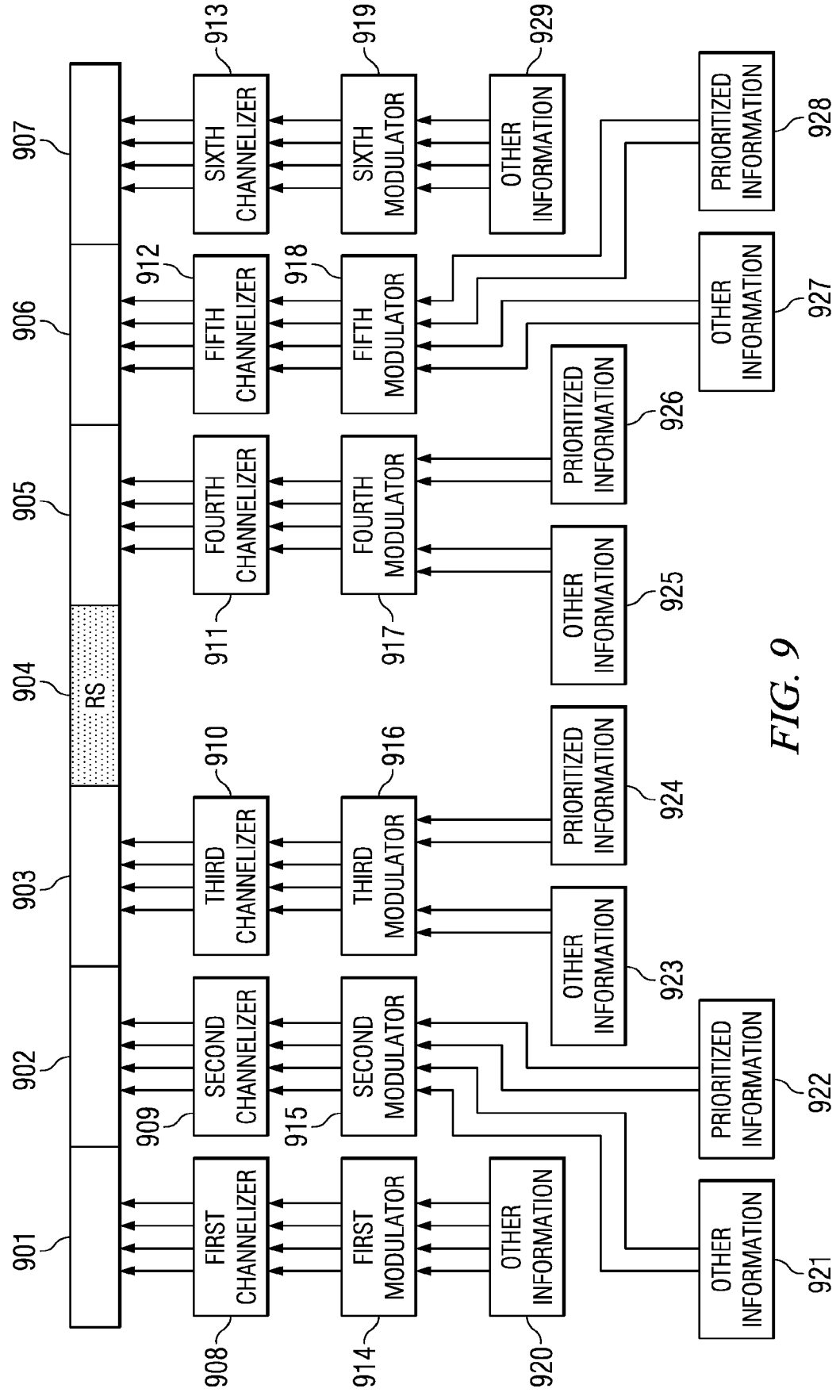

FIG. 9 shows a PUSCH transmission slot in accordance with another embodiment of the invention. In FIG. 9, the slot is the PUSCH 3GPP EUTRA slot, with a described timing structure as described in the introduction. Note that in FIG. 9, the Prioritized Information 922 is carried on baseband signal 902; the Prioritized Information 924 is carried on baseband signal 903; the Prioritized Information 926 is carried on baseband signal 905; the Prioritized Information 928 is carried on baseband signal 906. Since baseband signal 923 and 925 surround the baseband RS signal in 924, the Prioritized Information 924 and 926 is given protection in high-mobility environments. In addition, since signals 902 and 906 are baseband signals which are second-adjacent to the RS in 924, the Prioritized Information 922 and 928 is given certain protection in high-mobility environments. Thus, in FIG. 9, the Second Modulator 915 is used to Modulate together both Other Information 912 and the Prioritized Information 922. Thus, in FIG. 9, the Third Modulator 916 is used to Modulate together both Other Information 923 and the Prioritized Information 924. Thus, in FIG. 9, the Fourth Modulator 917 is used to Modulate together both Other Information 925 and the Prioritized Information 926. Thus, in FIG. 9, the Fifth Modulator 918 is used to Modulate together both Other Information 927 and the Prioritized Information 928. A Possible embodiment of Modulators 915, 916, 917 and 918 is shown by 702 of FIG. 7. In 702, the Other Information 703 is mapped to complex samples 709 using Symbol Mapper 706, while the Prioritized Information 704 is mapped to complex samples 708 using Symbol Mapper 707. Symbol Mappers 706 and 707 can be simple BPSK, QPSK, 8-PSK, 16 QAM, 64 QAM, sequence modulation, or any other digital modulation techniques. Collection of complex samples from 708 and 709 is performed using Symbol Collector 705. In some embodiments, the Symbol Collector 705 is used to simply multiplex the Mapped Priority Information 708 and Mapped Other Information 709. This multiplexing can be performed in a number of different conventions. For example, in some embodiments, Symbol Collector 705 can simply append the Mapped Priority Information 708 at the end of the Mapped Other Information 709. In other embodiments, Symbol Collector 705 can simply append the Mapped Other Information 709 at the end of the Mapped Priority Information 708. In other embodiments, Symbol Collector 705 can simply interlace the Mapped Other Information 709 and the Mapped Priority Information 708. Note that other operations of a Symbol Collector 705, according to some pre-arranged convention are not precluded. Thus in FIG. 7, the Mapped Other Information 709 and the Mapped Priority Information 708 are Collected using the Symbol Collector 705 to produce Modulated Samples 701. In FIG. 9, the Prioritized Information 922, 924, 926, 928 could be prior-encoded which means that all arrive from one channel encoder. In some embodiments, 922, 924, 926, 928 could even be identical. Similarly, Other Information 920, 921, 923, 925, 927 and 929 can also be prior encoded, where all arrive from one channel coder. The encoding may be performed using a turbo encoder using known techniques. Modulators 914 and 919 can be selected from BPSK, QPSK, 8-PSK, 16 QAM, 64 QAM, sequence modulation, or any other digital modulation techniques. This, however, is not mandatory. Channelizers 908, 909, 910, 911, 912, and 913 can be the described Channelizer 221 in FIG. 2. Note that other embodiments of Channelizers are possible, including variations of 221, such as removing the Transform Precoder. Note that, in FIG. 9, the Prioritized Information 924 is transmitted in the symbol 903, which is adjacent to the RS symbol 904. Similarly, the Prioritized Information 926 is transmitted in the symbol 905, which is adjacent to the RS symbol 904. In addition, note that Prioritized Information 922 is transmitted in the symbol 902, which is second-adjacent to the RS symbol, and Prioritized Information 928 is transmitted in the symbol 906, which is also second-adjacent to the RS symbol 904. This is tolerable since the second-adjacent symbol to the RS still maintains a substantial amount of channel coherence from the RS. Thus, in certain cases, it is possible to use the second-adjacent symbol to the RS. Thus, the FIG. 9 can represent a slot structure for joint transmission of Control Information and other Information on the physical uplink shared channel (PUSCH).

Note that, when Prioritized Information is transmitted in the PUSCH, certain samples (in the base-band) of the Other Information may have to be punctured, in order to provide space for Prioritized Information. This puncturing can be pre-arranged and according the 3GPP puncturing convention described in the specification. However, since Other Information can already be encoded, it is typically possible to infer the Other Information (as well) at the receiver.

Referring still to FIG. 9, as discussed earlier prioritized control information can be mapped surrounding the DM RS in decreasing order of priority. For instance, ACKNAK can be immediately surrounding the RS. Then, the next can be rank information, which is then surrounding the ACKNAK information, etc. In this case, ACKNAK information 924, 926 may be sent with other information 923, 925 as described with respect to Table 1 and Table 2 and then located in symbols 903 and 905 immediately adjacent DM RS symbol 904. Similarly, rank information 922, 928 may be sent with other information 921, 927 as described with respect to Table 3 and Table 4 and then located in symbols 902 and 906 to thereby surround the ACKNAK symbols 903, 905 and DM RS symbol 904.

Figure 10:
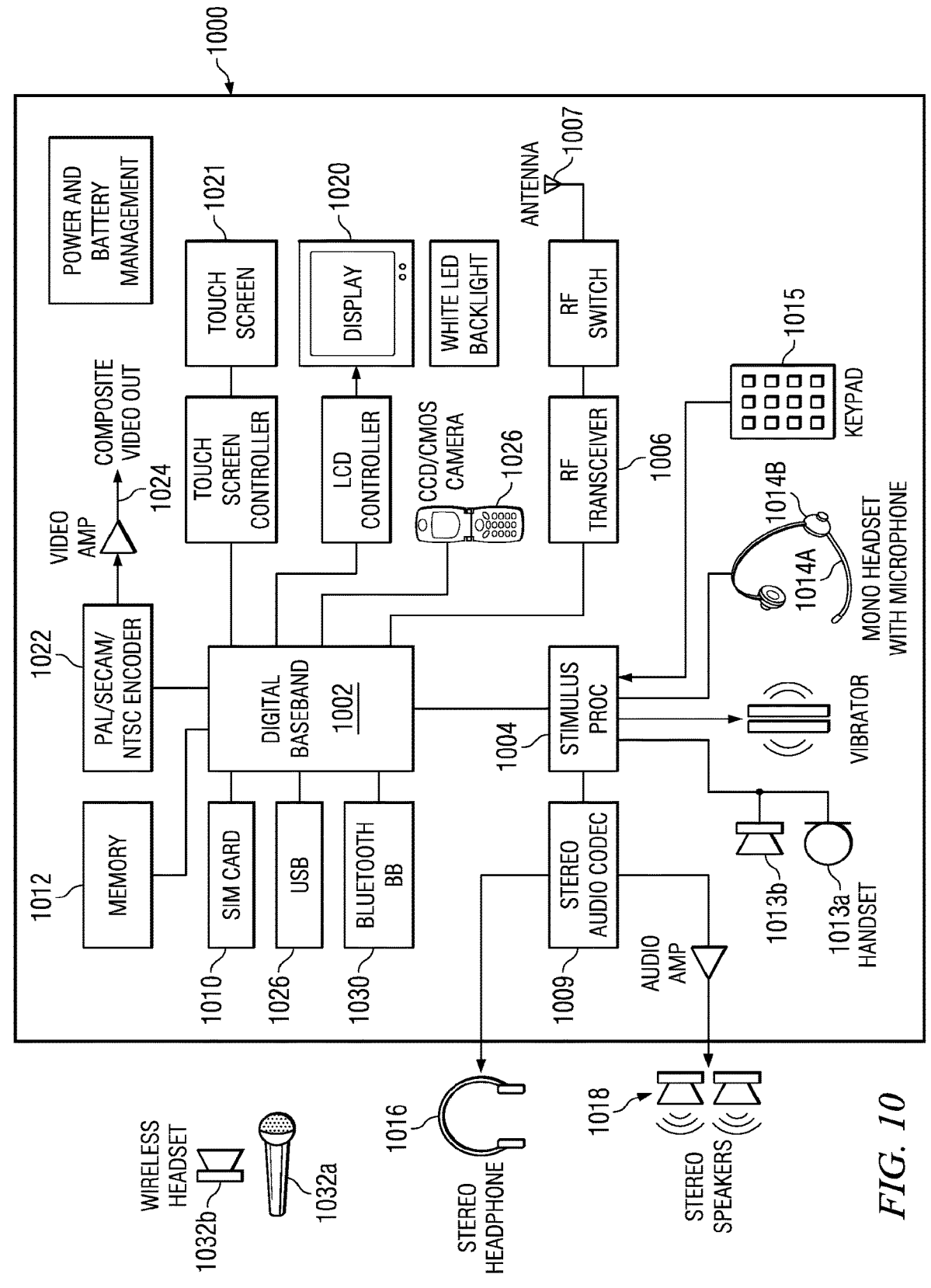
FIG. 10 is a block diagram of a cellular phone for use in the network of FIG. 12.

FIG. 10 is a block diagram of mobile user equipment (UE) 1000 for use in the network of 1200. Digital baseband (DBB) unit 1002 can include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 includes a receiver for receiving a stream of coded data frames and commands from a cellular base station via antenna 1007 and a transmitter for transmitting a stream of coded data frames to the cellular base station via antenna 1007. Transmission of the PUSCH data is performed by the transceiver using the PUSCH resources designated by the serving NodeB. In some embodiments, frequency hopping may be implied by using two or more bands as commanded by the serving NodeB. In this embodiment, a single transceiver can support multi-standard operation (such as EUTRA and other standards) but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by the mobile UE unite 1000.

Note that the EUTRA defines SC-FDMA (via DFT-spread OFDMA) as the uplink modulation, which is reflected in the described embodiments of the Channelizer 201 in FIG. 2. The basic SC-FDMA DSP radio can include discrete Fourier transform (DFT), resource (i.e. tone) mapping, and IFFT (fast implementation of IDFT) to form a data stream for transmission. To receive the data stream from the received signal, the SC-FDMA radio can include DFT, resource de-mapping and IFFT. The operations of DFT, IFFT and resource mapping/de-mapping may be performed by instructions stored in memory 1012 and executed by DBB 1002 in response to signals received by transceiver 1006. Likewise, selection of how to map Priority Information (PI) and which channel to use (PUSCH or PUCCH) may be performed by instructions stored in memory 1012 and executed by DBB 1002.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032*a* and headset 1032*b* for sending and receiving voice data. DBB 1002 can also be connected to display 1020 and can send information to it for interaction with a user of the mobile UE 1000 during a call process. Display 1020 may also display pictures received from the network, from a local camera 1026, or from other sources such as USB 1026. DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder unit 1022 can provide encoding according to PAL/SECAM/NTSC video standards.

Figure 11:
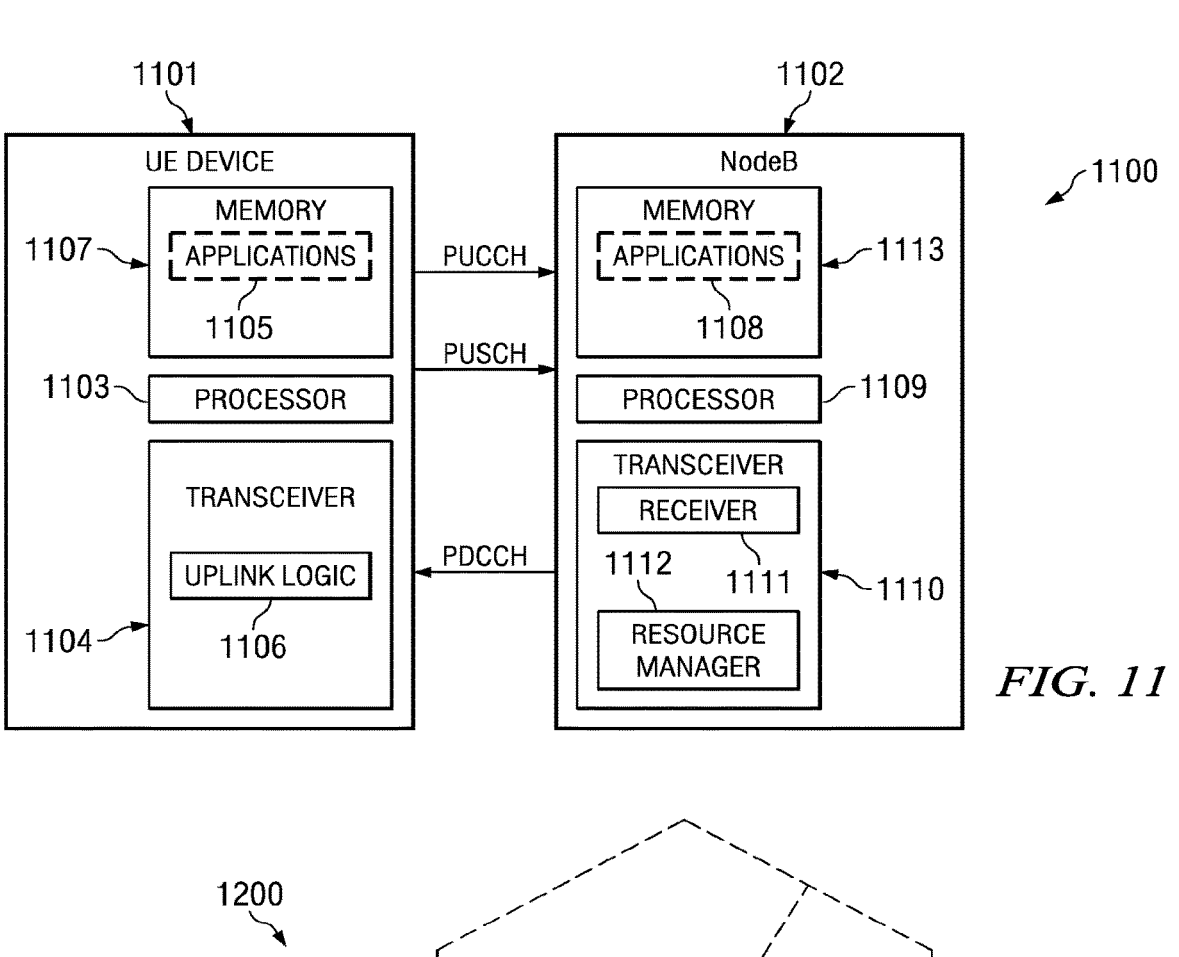
FIG. 11 is a block diagram illustrating operation of a NodeB and a User Equipment in the network system of FIG. 12.

FIG. 11 is a block diagram illustrating operation of a NodeB and a mobile UE in the network system of 1200. As shown in FIG. 11, wireless networking system 1100 comprises a mobile UE device 1101 in communication with a NodeB 1102. The mobile UE device 1101 may represent any of a variety of devices such as a server, a desktop computer, a laptop computer, a cellular phone, a Personal Digital Assistant (PDA), a smart phone or other electronic devices. In some embodiments, the electronic mobile UE device 1101 communicates with the NodeB 1102 based on a LTE or E-UTRAN protocol. Alternatively, another communication protocol now known or later developed can be used.

As shown, the mobile UE device 1101 comprises a processor 1103 coupled to a memory 1107 and a Transceiver 1104. The memory 1107 stores (software) applications 1105 for execution by the processor 1103. The applications 1105 could comprise any known or future application useful for individuals or organizations. As an example, such applications 1105 could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications 1105, at least some of the applications 1105 may direct the mobile UE device 1101 to transmit UL signals to the NodeB (base-station) 1102 periodically or continuously via the transceiver 1104. In at least some embodiments, the mobile UE device 1101 identifies a Quality of Service (QoS) requirement when requesting an uplink resource from the NodeB 1102. In some cases, the QoS requirement may be implicitly derived by the NodeB 1102 from the type of traffic supported by the mobile UE device 1101. As an example, VOIP and gaming applications often involve low-latency uplink (UL) transmissions while High Throughput (HTP)/Hypertext Transmission Protocol (HTTP) traffic can involve high-latency uplink transmissions.

As shown in FIG. 11, the transceiver 1104 comprises uplink logic 1106. The uplink logic executes instructions how to map Priority Information (PI) that is combined with other information as described in more detail above and which channel to use (PUSCH or PUCCH). Some of these instructions may be stored in memory 1107 and executed when needed. As would be understood by one of skill in the art, the components of the Uplink Logic 1106 may involve the physical (PHY) layer and/or the Media Access Control (MAC) layer of the transceiver 1104.

As shown in FIG. 11, the NodeB 1102 comprises a Processor 1109 coupled to a memory 1113 and a transceiver 1110. The memory 1113 stores applications 1108 for execution by the processor 1109. The applications 1108 could comprise any known or future application useful for managing wireless communications. At least some of the applications 1108 may direct the base-station to manage transmissions to or from the user device 1101. In particular, NodeB 1102 is operable to receive symbols from UE 109 which contain prioritized control information combined with other information located adjacent or near adjacent an RS symbol. The NodeB is operable to recover the priority information and the other information, based upon interleaving schemes agree to between the NodeB and the UE.

Transceiver 1110 comprises an uplink Resource Manager 1122, which enables the NodeB 1102 to selectively allocate uplink PUSCH resources to the user device 1101. As would be understood by one of skill in the art, the components of the uplink resource manager 1112 may involve the physical (PHY) layer and/or the Media Access Control (MAC) layer of the transceiver 1110. Transceiver 1110 includes a Receiver 1111 for receiving transmissions from various UE within range of the NodeB.

FIG. 13 is a flow diagram illustrating uplink transmission in the network system of FIG. 12. Under various circumstances, a physical uplink shared channel (PUSCH) is allocated from a transmitter to a receiver, using the format of FIG. 1. The channel has at least one time slot with each time slot having a plurality of symbols. Each symbol is generated from at least one digital sample. Each slot contains at least one reference symbol (RS) as illustrated in FIG. 1.

As information is provided for transmission on the uplink channel, prioritized information is classified 1304 to distinguish it from the other information. As discussed earlier, prioritized information may be ACKNACK information, CQI information, Rank information, PMI information, SRI information, or other types of critical system information.

Once classified, digital samples are produced 1306 using an element of the prioritized information (PI), as described with regard to FIGS. 3-9. Furthermore, the PI may be combined with portions of the other information to form prioritized samples, as described with regard to FIGS. 8 and 9. These samples are then used generate 1308 a priority symbol as described with respect to FIG. 2 and FIGS. 3-9 using a channelizer module. The channelizer module may be implemented in hardware circuitry, by execution of instructions on a processor with appropriate hardware support, or various combinations of hardware and software. As discussed earlier, priority symbols may include only priority information, or a combination of priority and other information.

The priority symbols are transmitted 1312 via the PUSCH by placing the priority symbol in close proximity to a reference symbol. It is preferable to locate the priority symbol such that separation of the priority symbol and a reference symbol does not exceed a time duration of one symbol, t(s). As discussed with regard to FIGS. 3-9, the priority symbol(s) may be located directly before or after the RS, or one symbol away from the RS. Two priority symbols may be located immediately before or/and after an RS. Symbols containing the other information are transmitted on available locations in the uplink channel format. In one embodiment, a symbol containing ACKNAK information combined with a portion of other information is placed adjacent the RS, while a symbol containing rank information combined with a portion of the other information is placed adjacent the ACKNAK symbol.

FIG. 14 is a flow diagram illustrating another embodiment of uplink transmission in the network of FIG. 12. Generally, when a UE first enters a cell, a physical uplink control channel (PUCCH) is established 1402 between the UE and the eNB. This may require an autonomous request via the non-synchronized physical random access channel (PRACH) in order to establish communication between the UE and eNB. A physical uplink shared channel (PUSCH) is also established 1404. The Physical Uplink Shared Channel (PUSCH) can be dynamically scheduled. This means that time-frequency resources of PUSCH are re-allocated every sub-frame. This re-allocation is found in the Physical Downlink Control Channel (PDCCH). Alternatively, resources of the PUSCH can be allocated semi-statically, via the mechanism of persistent scheduling. Thus, any given time-frequency PUSCH resource can possibly be used by any mobile UE, depending on the scheduler allocation. Physical Uplink Control Channel (PUCCH) is different than the PUSCH, and the PUCCH is used for transmission of uplink control information (UCI). Frequency resources which are allocated for PUCCH are found at the two extreme edges of the uplink spectrum. In contrast, frequency resources which are used for PUSCH are in between. Since PUSCH is designed for transmission of user data, re-transmissions are possible, and PUSCH is expected to be generally scheduled with less stand-alone sub-frame reliability than PUCCH.

If data is not available for transmission 1406, then control information is transmitted 1408 from the UE to the eNB using the PUCCH, as described earlier.

If data is available for transmission 1406, then priority information such as control information is mapped 1410 to one or more symbols adjacent an RS symbol using a Channelizer as discussed above with reference to FIG. 3-9. Prioritized control information can be mapped surrounding the DM RS in decreasing order of priority. For instance, ACKNAK can be immediately surrounding the RS. Then, the next can be RI, which is then surrounding the ACKNAK information, etc. The priority information is then transmitted 1412 from the UE to the eNB using the PUSCH.

At any given time, the UE uses only either the control channel (PUCCH) or the shared channel (PUSCH) for transmission of control information and data information. By only using one channel at any given time, peak-to-average power levels are maintained at lower levels.

Figure 15:
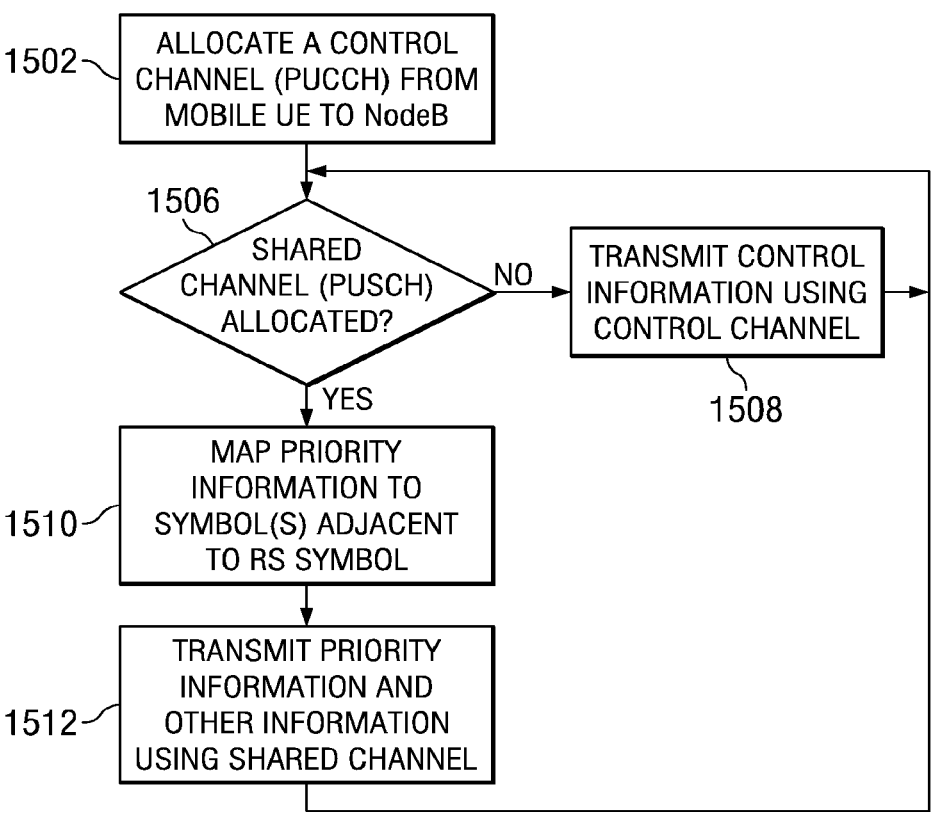
FIG. 15 is a flow diagram illustrating yet another embodiment of uplink transmission in the network of FIG. 12.

FIG. 15 is a flow diagram illustrating yet another embodiment of uplink transmission in the network of FIG. 12. Generally, when a UE first enters a cell, a physical uplink control channel (PUCCH) is established 1502 between the UE and the eNB. This may require an autonomous request via the non-synchronized physical random access channel (PRACH) in order to establish communication between the UE and eNB.

Depending on operating mode, a physical uplink shared channel (PUSCH) may also be allocated. The PUSCH may be allocated in response to a request by the UE, or may be allocated in response to a command or directive by the eNB. In other modes of operation, no PUSCH is allocated. If a UE determines 1506 that a PUSCH is not allocated, then the UE transmits 1508 control information on the PUCCH.

If the UE determines 1506 that a PUSCH has been established between it and the eNB, then, then priority information such as control information is mapped 1510 to one or more symbols adjacent to or within one symbol time (T) of an RS symbol using a Channelizer as discussed above with reference to FIGS. 3-9. The priority information is then transmitted 1512 from the UE to the eNB using the PUSCH.

If other information is available for transmission from the UE, then symbols representing the other information are transmitted 1512 on the PUSCH in available symbol locations, as discussed with reference to FIGS. 3-9. As discussed above, priority information and other information may also be combined in a priority symbol and mapped 1510 adjacent an RS symbol for transmission 1512.

At any given time, the UE uses only either the control channel (PUCCH) or the shared channel (PUSCH) for transmission of control information and data information. By only using one channel at any given time, peak-to-average power levels are maintained at lower levels.

As used herein, the term "coupled" or "connected," means electrically connected, wire-line or wireless, including where additional elements may be in the electrical connection path. While the invention has been described with reference to illustrative embodiments, this description is not intended to be construed in a limiting sense. Various other embodiments of the invention will be apparent to persons skilled in the art upon reference to this description. It is therefore contemplated that the appended claims will cover most such modifications of the embodiments as fall within the true scope and spirit of the invention.

The invention claimed is:

1. A method comprising:

transmitting a Rank Indicator (RI) using symbol k;

transmitting an ACK/NAK using symbol k+1; and transmitting a reference signal (RS) using symbol k+2, wherein symbols k, k+1, and k+2 are consecutive in time and are transmitted over a physical uplink shared channel (PUSCH).

2. The method of claim 1, further comprising:

transmitting the ACK/NAK using symbol k+3; and transmitting the Rank Indicator (RI) using symbol k+4,
wherein symbols k, k+1, k+2, k+3, and k+4 are consecutive in time.

3. The method of claim 2, further comprising encoding physical uplink shared channel (PUSCH) data using a turbo encoder; and transmitting the encoded PUSCH data using symbols k−1 and k+5, wherein symbols k−1, k, k+1, k+2, k+3, k+4, and k+5 are consecutive in time.

4. The method of claim 3, further comprising transmitting the encoded PUSCH data using at least one of the symbols from a set of symbols {k, k+1, k+3, k+4}.

5. The method of claim 4, wherein transmitting the ACK/NAK and the encoded PUSCH data comprises:

producing a set A[k+1] of samples by modulating said ACK/NAK;

producing a set B[k+1] of samples by modulating said encoded PUSCH data;

combining sets A[k+1] and B[k+1] to produce a set of samples C[k+1]; and transforming the set of samples C[k+1] using a DFT pre-coder, wherein the symbol k+1 is produced from the set of samples C[k+1].

6. The method of claim 4, wherein transmitting the RI and the encoded PUSCH data comprises:

producing a set A[k] of samples by modulating said RI;

producing a set B[k] of samples by modulating said encoded PUSCH data;

combining sets A[k] and B[k] to produce a set of samples C[k]; and transforming the set of samples C[k] using a DFT pre-coder, wherein the symbol k is produced from the set of samples C[k].

7. The method of claim 1, wherein transmitting the ACK/NAK comprises:

receiving at least one data packet; and producing the ACK/NAK by performing error detection on the received data packet.

8. The method of claim 7, wherein performing error detection comprises performing a circular redundancy check (CRC) decoding.

9. The method of claim 1, wherein transmitting the Rank Indicator (RI) comprises:

receiving a first downlink reference signal (DLRS) from a first antenna port;

receiving a second downlink reference signal (DLRS) from a second antenna port; and producing the RI using the received first DLRS and on the received second DLRS.

10. A method comprising:

receiving a reference signal (RS) using symbol k+2;

demodulating an ACK/NAK using symbol k+1; and demodulating a Rank Indicator (RI) using symbol k, wherein symbols k, k+1, and k+2 are consecutive in time and are received via a physical uplink shared channel (PUSCH).

11. The method of claim 10, further comprising:

demodulating the ACK/NAK using symbol k+3; and demodulating the Rank Indicator (RI) using symbol k+4,
wherein symbols k, k+1, k+2, k+3, and k+4 are consecutive in time.

12. The method of claim 11, further comprising demodulating encoded PUSCH data using symbols k−1 and k+5, wherein symbols k−1, k, k+1, k+2, k+3, k+4, and k+5 are consecutive in time; and decoding the PUSCH data using a turbo decoder.

13. The method of claim 12, further comprising demodulating the encoded PUSCH data using at least one of the symbols from a set of symbols {k, k+1, k+3, k+4}.

14. The method of claim 13, receiving the symbol k+1;

producing a set D[k+1] of samples from the symbol k+1;

extracting a set E[k+1] of samples from the set D[k+1];

extracting a set F[k+1] of samples from the set D[k+1];

demodulating the ACK/NAK using samples from the set E[k+1]; and demodulating the PUSCH data using samples from the set F[k+1].

15. The method of claim 13, further comprising:

receiving the symbol k;

producing a set D[k] of samples from the symbol k;

extracting a set E[k] of samples from the set D[k];

extracting a set F[k] of samples from the set D[k];

demodulating the RI using samples from the set E[k]; and demodulating the PUSCH data using samples from the set F[k].

16. The method of claim 10, further comprising transmitting at least one data packet that is used to produce the ACK/NAK.

17. The method of claim 10, further comprising:

transmitting a first downlink reference signal (DLRS) from a first antenna port; and transmitting a second downlink reference signal (DLRS) from a second antenna port, wherein the RI is responsive to the first DLRS and to the second DLRS.

18. An apparatus comprising:

circuitry for transmitting a Rank Indicator (RI) using symbol k;

circuitry for transmitting an ACK/NAK using symbol k+1; and circuitry for transmitting a reference signal (RS) using symbol k+2, wherein symbols k, k+1, and k+2 are consecutive in time and are transmitted over a physical uplink shared channel (PUSCH).

19. The apparatus of claim 18, wherein the apparatus is a cellular telephone.

20. An apparatus comprising:

circuitry for receiving a reference signal (RS) using symbol k+2;

circuitry for demodulating an ACK/NAK using symbol k+1; and circuitry for demodulating a Rank Indicator (RI) using symbol k, wherein symbols k, k+1, and k+2 are consecutive in time and are received via a physical uplink shared channel (PUSCH).

21. The apparatus of claim 20, wherein the apparatus is a NodeB.

* * * * *